United States Patent [19]

Kobayashi

[11] 4,241,198
[45] Dec. 23, 1980

[54] RELEASING AGENT

[75] Inventor: Naotake Kobayashi, Utsunomiya, Japan

[73] Assignee: Sony Corporation, Tokyo, Japan

[21] Appl. No.: 973,419

[22] Filed: Dec. 26, 1978

[30] Foreign Application Priority Data

Dec. 29, 1977 [JP] Japan .................... 52-158184

[51] Int. Cl.$^3$ .................... C08F 26/12; C08F 220/18; C08C 19/42
[52] U.S. Cl. .................... 525/360; 156/289; 427/208; 427/209; 427/208.4; 427/208.6; 427/208.8; 428/40; 428/41; 428/42; 428/261; 428/352; 525/329; 525/370; 526/317; 526/329.3; 526/263; 526/273; 526/304; 526/312
[58] Field of Search .................... 526/48.1, 47, 15, 16, 526/30, 42, 263, 273, 329.3, 304, 312, 317; 156/289; 428/40, 41, 42, 261, 352; 427/207 R, 207 A, 207 B, 207 C, 207 D, 208, 209, 428; 264/130; 525/329, 360, 370

[56] References Cited

U.S. PATENT DOCUMENTS

| | | | |
|---|---|---|---|
| 2,923,646 | 2/1960 | Jordon, Jr. | 428/352 X |
| 3,491,075 | 1/1970 | Dekking | 526/48.1 |
| 3,769,254 | 10/1973 | Anderson et al. | 526/48.1 X |
| 4,005,247 | 1/1977 | Graham | 526/15 |
| 4,018,957 | 4/1977 | Werner et al. | 427/209 X |

Primary Examiner—Ronald H. Smith
Assistant Examiner—Thurman K. Page
Attorney, Agent, or Firm—Hill, Van Santen, Steadman, Chiara & Simpson

[57] ABSTRACT

A releasing agent containing:
(A) a copolymer which is produced by copolymerization of:
(a) a monomer mixture comprising 70 to 40 percent by weight (hereafter represented by "wt. %") stearyl acrylate and/or stearyl methacrylate and 30 to 60 wt. % acrylonitrile; and
(b) an ethylenically unsaturated compound being copolymerizable with the monomer mixture and having functional groups reactive with metal alcoholate, the ethylenically unsaturated compound being used in an amount of 0.5 to 30 part by weight (hereafter represented by "wt.part") per 100 wt. part of the monomer mixture; and
(B) a metal alcoholate being represented by the following general formula:

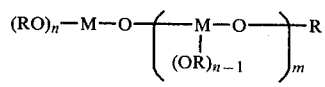

wherein R is a hydrocarbon group having 1 to 20 carbon atoms or this hydrocarbon group further having oxygen atom, nitrogen atom, sulfur atom or halogen atom, including the case R being identical or not identical with each other in the general formula and R being combined with each other, n is an integer from 1 to 4, m is an integer from zero to 10, and M is a metal element belonging to III, IV and V groups of the periodic table. Another releasing agent containing a copolymer of the above monomer mixture, the above ethylenically unsaturated compound and further at least one monomer being selected from the group consisting of cyclohexyl group-containing ethylenically unsaturated compound in an amount of 2 to 30 wt.part per 100 wt.part of the monomer mixture, and imidazole compound with ethylenically unsaturated group in an amount of 0.5 to 15 wt.part per 100 wt. part of the monomer mixture, wherein the functional groups in the copolymerizable compound monomer are also at least partially cross-linked with the above metal alcoholate.

14 Claims, 2 Drawing Figures

RELEASING AGENT

BACKGROUND OF THE INVENTION

1. Field of the Invention

The present invention relates to a composition, and more particularly to a composition, and more particularly to a releasing agent which is very suitable for treatment of a released sheet or a pressure sensitive adhesive tape or sheet to impart a good releasing property thereto, wherein the pressure sensitive adhesive tape or sheet has a base comprising, a flexible film or sheet consisting of paper, non-woven fabric, cloth, cellulose acetate, regenerated cellulose, polyethylene terephthalate, soft polyvinyl chloride and so on.

2. Description of the Prior Art

A pressure sensitive adhesive tape or sheet is generally wound in a roll form in which an adhesive layer is piled up on an adjacent back surface of a tape or sheet base material or is protected with a released sheet. The adhesive layer is thus protected for a time, however, it should have a good releasing property while in use so that the roll-shapedly wound pressure sensitive adhesive tape is easily released from the roll form or the released sheet with a relatively weak force. According to a known method to improve the property of a parting surface of the base material or the released sheet, the parting surface is treated with a silicone coating. However, the known pressure sensitive adhesive tape having the silicone coating has the following diadvantages:

(a) The silicone coating must be printed and hardened on the parting surface at a relatively high temperature of 130° to 180° C., which causes a dimensional fluctuation such as elongation, shrinkage, bending or the like, or a material deterioration such as brittlement in the base film.

(b) The silicone coating is formed by polymerization of a low molecular weight compound and unhardened compound is liable to remain therein. Because these low molecular weight materials are transferred to the pressure sensitive adhesive layer, the adhesion force is lowered and an object with the adhesive layer adhering thereon is contaminated.

(c) There is a case that an adherence between a certain kind of base material and a releasing agent is insufficient. This causes a transference of the releasing agent and a contamination of the object.

(d) An adhesion force between the pressure sensitive adhesive layer and this releasing agent surface is too weak due to the good releasing property. As the result, the adhesive of the tape in one path can not sufficiently adhere to the back surface of the tape in another or adjacent inner path so that both are easy to separate from each other.

In order to overcome the above disadvantages, organic releasing agents has been studied. The known organic releasing agents are polyethylene, polypropylene, vinylidene chloride, tetrafluoroethylene, amino aldehyde, shellac, wax paraffins, chromium chloride stearate, a combination of chromium stearate and ethyl cellulose or a solvent, alkyl acid phosphate, a combination of titanium dioxide and nitrocellulose, fluorocarbon, perfluorocarbonoxylicamide, a clay blend of sodium alginate, sodium hydroxide and sodium hydrosilicate, a blend of polyvinyl butyral, hardened castor oil and stearic acid, a copolymer of vinyl pyrrolidone and vinyl stearate, a copolymer of vinyl alcohol and vinyl stearate, a copolymer of vinyl stearate, maleic acid anhydride and vinyl acetate, a copolymer of partial higher fatty acid ester of polyvinyl alcohol and higher alkyl vinyl ester or ether, higher alkylamine salts, polyvinyloctadecylurethane, a copolymer of acrylic acid and octadecyl acrylic acid, a copolymer of polyvinyl alcohol and N-octadecyl carbamate, a copolymer of polyvinyl alcohol and N-dihydroperfluoroalkylisocyanate, a copolymer of carbamic acid and polyvinyl alcohol, and so on. Effective releasing agent among these organic compounds is a polymer having carbon atoms of more than 13, particularly of 18 (octadecyl or stearyl group). For example, Japanese Patent Publication No. 5382/1961 discloses a four-component copolymer of octadecyl acrylic acid ester, acrylic acid, acrylonitrile and methyl acrylate. Japanese Patent Publication No. 9599/1969 discloses a binary copolymer of stearyl methacrylate and acrylonitrile. U.S. Pat. No. 2607711 uses a copolymer of octadecyl acrylate and arcylic acid. Japanese Patent Publication No. 8903/1965 uses a copolymer of octadecyl vinylether, acrylonitrile, maleic acid anhydride and vinyl acetate. Japanese Patent Publication Nos. 17661/1965, 2894/1967 and 5006/1968 disclose releasing agents which are produced by reacting alkylimine with higher alkyl isocyanate and higher alkyl carboxylic acid. Further, Japanese Patent Publication No. 21855/1968 discloses N-long chain alkyl (metha) acrylic acid amide.

The use of the releasing agent having the long chain alkyl group can admirably overcome some of the above-described disadvantages of the known silicone-type releasing agent. That is, as to the disadvantages (a) and (b), a polymer already produced by polymerization has only to be coated and dried on a base material as a plastic film. Accordingly, the high temperature printing is not required to form a releasing agent layer and the transferring and contamination by the lower molecular weight compound decreaser. The disadvantage (c) can be avoided because on the synthesis of the releasing agent monomers having various polarities can be easily introduced. The disadvantage (d) can be overcome by itself in such a way that an ordinary releasing strength of the organic parting agent is imparted to the releasing agent having the long chain alkyl group. This is because the adhesion force of the adhesive layer to the organic parting agent layer of the base material is not too weak different from the silicone-type releasing agent and therefore it has a suitable built-up beam property and readhesion strength. In this case, the users must take care in general that the adhesion force is too strong to peel off the adhesive layer again from the parting agent layer.

Thus, it has been supposed that a releasing agent suitable for the pressure sensitive adhesive tape having the base (plastic film) was finished by the use of the releasing agent containing the above higher alkyl group. However, there are important problems to be still avoided. The largest defect of the releasing agent is in an aging of the coating property when it is coated on the base material. It is supposed that the aging is due to the deterioration of the releasing property of the releasing agent itself and to the poor adherence between the releasing agent and the base material. The former is a phenomenon which is often observed on the pressure sensitive adhesive tape having the organic releasing agent layer. For example, the tape is wound off in the beginning at a velocity of 300 mm/min and with a force of 100 to 300 g per 5 cm width, however, in some cases it shows a winding-off force of 600 to 2,000 g or of more than 600 to 2,000 g per 5 cm width after a long time has passed. The reason of the aging of the adhering force at the interfacial surface between the releasing agent and the adhesive is still not understood. In this connection, it is generally said that a surface having a lower energy is formed in the case a density of methyl groups thereat is higher, and that a silicone-type releasing agent containing predominantly methyl silicone shows a very effective releasing property. Also the organic parting agent having the long chain alkyl group introduced can have such a lower energy surface, however, it can but form a very brittle releasing agent layer as it is and the transferring to the adhesive layer occurs. To prevent this, a high crystalline copolymer of the organic releasing agent and acrylonitrile or the like having, or an addition product consisting of the organic releasing agent and another polymer is used as a conventional organic releasing agent. When a releasing agent is coated on a base material such as regenerated cellulose having a relatively high polarity, functional groups having a high polarity are introduced into a part of the releasing agent (polymer), so that the adhering force to the base material is improved and the orientation regularity of the long chain alkyl group is increased to promote the parting effect by increasing density of methyl groups at the surface. However, in the organic releasing agent produced by the conventional technique, it is impossible to remove the aging of the releasing property of the above-mentioned agent itself.

The inventor has well studied about this problem and found out the following fact. That is, the releasing property of the organic parting agent containing the long chain alkyl group changes largely at about 45° C., which has a relation to the melting point of the oriented crystal of the long chain alkyl group. From this fact, the inventor has come to a conclusion that it is necessary to increase the density of the cross-linkages between the molecules of the releasing agent in order to prevent the change of the releasing property also at a temperature above the melting point of the long chain alkyl group segment. The conventional organic releasing agent has the disadvantage that the releasing property shows an aging, however, this has been overcome by the selected combination of the releasing agent and the adhesive, and the limitation of the condition of preservation or use, and so on. However, these measures can not bring about a fundamental solution of the disadvantage. In other words, the blocking of the adhesive tape due to the aging of the releasing property, the transferring of the releasing agent or the like is not avoided and the product can not be often provided for use. There is a known technique that cross-linking between the molecules of resin impart a heat resisting property thereto. However, since there was no clear explanation about the aging of the releasing property of the conventional organic releasing agent, a measure to prevent the aging by the cross-linking of the releasing agent can not almost found out. The inventor has studied the cross-linking of the releasing agent and confirmed that the conventional cross-linding has the following defects:

(a) According to the conventional cross-linking technique, for example, a condensation reaction of carboxylic group with hydroxyl group, an addition reaction of hydroxyl group with isocyanate, and the like, polar groups such as ester group, urethane group and so on are introduced into the molecule of the releasing agent. This results in an increased adhering force between the agent and the adhesive, and in a severe limitation of the base material.

(b) A significant heat or time are required for completing the reaction for the cross-linking. This causes a remarkable deterioration of the productivity of the product, and of the dimension and material of the base. Also in the case that unreacted substances still remain, the aging is further increased.

SUMMARY OF THE INVENTION

An object of the present invention is to provide a releasing agent without an aging of the releasing property.

Another object of the present invention is to provide a releasing agent without a blocking or transferring and without a change of adhering force of an adhesive.

A still further object of the present invention is to provide a releasing agent wherein a base material can be variously selected and maintain the property.

According to an aspect of the present invention, a releasing agent containing:

(A) a copolymer which is produced by copolymerization of:

(a) a monomer mixture comprising 70 to 40 wt.% (preferably 60 to 50 wt.%) stearyl acrylate and/or stearyl methacrylate and 30 to 60 wt.% (preferably 40 to 50 wt.%) acrylonitrile; and (b) an ethylenically unsaturated compound being copolymerizable with the monomer mixture and having functional groups reactive with metal alcoholate, the ethylenically unsaturated compound being used in an amount of 0.5 to 30 wt.part per 100 wt.part of the monomer mixture; as occasion demands, (c) another ethylenically unsaturated compound monomer being copolymerizable with the monomer of the monomer mixture and being used in an amount of 0 to 30 wt.part per 100 wt.part of the monomer mixture, and (B) a metal alcoholate being represented by the following general formula:

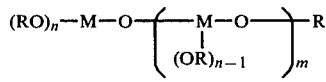

wherein R is a hydrocarbon group having 1 to 20 carbon atoms or this hydrocarbon group further having oxygen atom, nitrogen atom, sulfur atom or halogen atom, including the case R being identical or not identical with each other in the general formula and R being combined with each other, n is an integer from 1 to 4, m is an integer from zero to 10, and M is a metal element belonging to III, IV and V groups of the periodic table. According to another aspect of the present invention, a releasing agent containing:

(A) a copolymer which is produced by copolymerization of:

(a) a monomer mixture comprising 70 to 40 wt.% (preferably 60 to 50 wt.%) stearyl acrylate and/or stearyl methacrylate and 30 to 60 wt.% (preferably 40 to 50 wt.%) acrylonitrile; and (b) an ethylenically unsaturated compound being copolymerizable with the monomer mixture and having functional groups reactive with metal alcoholate, said ethylenically unsaturated compound being used in an amount of 0.5 to 30 wt. part per 100 wt. part of the monomer mixture;

(c) at least one monomer being selected from the group consisting of cyclohexyl group-containing ethylenically unsaturated compound in an amount of 2 to 30 wt. part per 100 wt. part of the monomer mixture, the imidazole compound with ethylenically unsaturated group in an amount of 0.5 to 15 wt. part per 100 wt. part of the monomer mixture; and as occasion demands, (d) another ethylenically unsaturated compound being copolymerizable with the monomer of the monomer mixture and being used in such an amount that the amount of the monomer mixture is more than 50 wt.%, preferably more than 70 wt.% in the total amount of the copolymer, and (B) a metal alcoholate being represented by the following general formula:

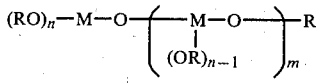

wherein R is a hydrocarbon group having 1 to 20 carbon atoms or this hydrocarbon group further having oxygen atom, nitrogen atom, sulfur atom or halogen atom, including the case R being identical or not identical with each other in the general formula and R being combined with each other, n is an integer from 1 to 4, m is an integer from zero to 10, and M is a metal element belonging to III, IV and V groups of the periodic table.

The other objects, features and advantages of the present invention will be apparent from the following description taken in conjunction with the accompanying drawings.

DESCRIPTION OF THE PREFERRED EMBODIMENTS

Figure 1:
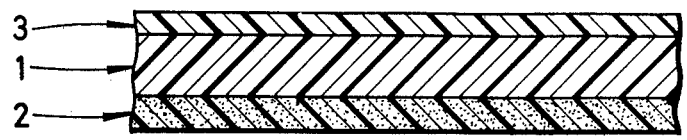
FIG. 1 is a cross-sectional view of an adhesive tape according to an embodiment of the present invention.

First, the releasing agent according to the one aspect of the present invention will be explained in more detail.

In the above-described copolymer, the monomer in the item (b) having the functional groups contains carboxyl group, hydroxyl group, amino group, amide group, epoxy group and the like, or means an ethylenically unsaturated compound monomer which secondarily produces these functional group in its molecule after a certain reaction. The monomer can be acrylic acid, methacrylic acid, crotonic acid, maleic acid, itaconic acid, acrylic-2-hydroxyethylester, acrylic-2-hydroxypropyl-ester, methacrylic-2-hydroxyethylester, methacrylic-2-hydroxypropylester, acrylic-1-methyl-2-hydroxyethylester, methacrylic-1-methyl-2-hydroxyethylester, 2-hydroxyvinylether, N-tertiarybutylaminoethylacrylate, N-tertiarylbutylaminobutylacrylate, N-tertiaryaminoethylmethacrylate, aminoethylvinylether, acrylamide, methacrylamide, N-methylolacrylamide, N-methylolmethacrylamide, glycidyl acrylate, glycidylmethacrylate, acrylgylcidylether and so on. The other ethylinically unsaturated compound monomer in the item (c) can be acrylic acid or methacrylic acid ester containing hydrocarbon group having a carbon number of 1 to 17, except steary acrylate, stearyl methacrylate and acrylonitrile in the item (a), and the compound in the item (b). This other ethylenically unsaturated compound can be methyl acrylate, ethyl acrylate, n-propyl acrylate, isopropyl acrylate, n-butyl acrylate, isobuthyl acrylate, cyclohexyl acrylate, benzyl acrylate, 2-ethylhexyl acrylate, decyl acrylate, lauryl acrylate, tridecyl acrylate, methyl methacrylate, ethyl methacrylate, propyl methacrylate, isopropyl methacrylate, n-butyl methacrylate, isobutyl methacrylate, tertiarybutyl methacrylate, cyclohexyl methacrylate, benzyl methacrylate, octyl methacrylate, 2-ethylhexyl methacrylate, lauryl methacrylate, tridecyl methacrylate, cetyl methacrylate and so on. Stylene, α-methylstylene, arylbenzene, vinylnaphthalene, 4-methylstylene, 2,4-dimethylstylene, 3-ethylstylene, 2,5-diethylstylene, 2-methoxystylene, vinyl acetate, vinyl propionate, vinyl butylate, methyl vinylether, isopropylvinyl ether, butylvinylether, 2-ethylhexylvinylether, 2-methoxyethylvinylether and the like can be used as the other ethylenically unsaturated compound.

The metal alcoholate described above quickly reacts with the functional groups at a considerably low temperature to complete the cross-linking without unreacted substances. Thus, a releasing agent free from the aging of the property is produced without the deterioration of the base material even after being left in atmospheres of 65% RH (Relative Humidity) at 20° C. and 80% RH at 65° C.

If the amount of acrylonitrile in the monomer mixture in the item (a) is lesser than 30 wt.%, the superior property of acrylonitrile forming a high crystalline structure and a polymer of a high melting point is extremely deteriorated, so that the releasing agent coating is brittle and sensitive to a temperature to suffer from the aging. On the other hand, the amount of acrylonitrile in excess of 60 wt.% in the monomer mixture results in a poor releasing property and a poor adhering force between the base material and the releasing agent to cause the blocking and the transferring. If the amount of the compound having the functional groups reactive with the metal alcoholate is less than 0.5 wt.part, a releasing agent is suffered from the aging even if being crosslinked with the metal alcoholate. The amount of this compound in excess of 30 wt.part causes a hard and brittle releasing coating and a deterioration of the releasing property. As described in the item (c), a part of the monomer mixture in the term (a) can be replaced by another ethylenically unsaturated monomer of less than 30 wt.part to improve the flexibility of the releasing coating and the adhering property to the base material within a scope that the releasing property of the coating should not be lowered. When the amount of this monomer is more than 30 wt.part, the releasing property becomes poor and the aging is too much.

The metal alcoholate is an alcoholate of a metal selected from III, IV and V groups of the periodic table. The metal alcoholate can be aluminium triisopropylate, aluminium trisecondarybutylate, titanium tetraisopropylate, titanium tetranormalbutylate, titanium tetra-2-ethylhexylate, antimony butylate, zirconium tetrasecondarybutylate, zirconium diethylate ditertiarybutylate, hafnium tetratertiarybutylate, ethylacetoacetate aluminium diisopropylate, triethanolamine titanium diisopropylate, an ammonium salt of titanium tetralactate, tetraoctyleneglycol titanate, polyalkyl titanate, for example, polymerized titanium tetrabutylate, polymerized titanium oleate, and so on.

The metal alcoholate of the present invention preferably has at least two R—O—M bonds in its molecule, where R is a hydrocarbon group having 1 to 20 carbon atoms or this hydrocarbon group having oxygen atom, nitrogen atom, sulfur atom or halogen atom, and M is a metal atom. That is, it is preferable to use the metal alcoholate in which the metal atom is not directly but indirectly combined with the carbon atom through the oxygen atom. It is supposed that the metal alcoholate having the R—O—M bonds in its molecule as such is combined with the functional group of the afore-said copolymer to form net-like structures (cross-linkages). The metal M is in practice preferably selected from III, IV or V group of the periodic table. Aluminium or titanium is more preferable as the metal M from the viewpoint of reaction velocity and so on. It is desired that the amount of the metal alcoholate is 0.01 to .30 wt.part, preferably 0.05 to 10 wt.part per 100 wt.part of the acrylic copolymer. In the case of the amount of less than 0.01 wt.part, an aging of the releasing force is liable to occur, and a blocking and transferring of the releasing agent appears due to an increased adhering force between the releasing agent and the adhesive layer. Also in the case of the amount of more than 30 wt.part, the releasing coating is hardened and brittle.

Another important problem regarding the aging of the coating property of the releasing agent is the adhesion property between the releasing agent and the base material. The conventional releasing agent having a higher alkyl group is effective for the base material comprising a relatively strong polar plastic film of regenerated cellulose, cellulose acetate, polyethylene terephthalate or the like. Particularly when a small amount of carboxyl group, hydroxyl group, amino group, epoxy group or the like having a strong polarity is introduced into the releasing agent, this releasing agent and the strong polar base material are ionically drawn to each other to improve the adhesion force of the releasing agent, and to promote the orientation of the long chain alkyl group so that an effective releasing property is obtained. On the other hand, when a relatively low or non-polar film of polyethylene, polypropylene, polyvinyl chloride or the like is used as the base material, an adhesion force between the film and the releasing agent is insufficient, and particularly, the releasing agent with an improved releasing property by introduction of a small amount of the functional group has only a low adhesion force to the non-polar film. This has been proved to be a reason of the transferring of the releasing agent. According to the present invention, the number of the active hydrogens can be controlled within a desired value by the crosslinking with the metal alcoholate such that the polarity of the releasing agent is optionally controlled for any base material having different polarities. It is accordingly unnecessary in the present invention to change the kind of the releasing agent corresponding to the kind of the base material as in the conventional technique. That is, the selection of the addition amount of the metal alcoholate results in a sufficient adhesion force of the releasing agent to the base material. As is already described, the metal alcoholate can be added such that the releasing agent coating shows a good releasing property when being separated from the adhesive layer.

In the case of the use of the non-polar film of polyethylene, polypropylene or the like without containing any plasticizer, the adhesion force between the film and the releasing agent can be secondarily increased by an activating treatment of the film surface such as a formation treatment, a corona treatment or the like. However, in the non-polar film such as soft polyvinyl chloride containing a plasticizer, this plasticizer migrates to the film surface to decrease the adhesion force and to easily cause the transfering of the releasing agent and the contamination of an object to which the adhesive layer adheres. Particularly with regard to the soft polyvinyl chloride film, there was no releasing agent which can completely prevent the aging of the property, because the afore-said two disadvantages (a) and (b) are reversely influenced by each other. Also any releasing agents described above can completely prevent the aging when used as the releasing agent of the soft polyvinyl chloride. There are some releasing agents showing a relatively small aging at a relatively low temperature and humidity, for example, at 40° C. and up to 60% RH. However, the aging of these agents is remarkably increased at above that temperature and humidity. Such an atmosphere can be ordinarily seen when the product is preserved in a warehouse and transported in summer season of a high temperature and humidity. Particularly when the product is exported by sea, it is said that the temperature inside a ship's warehouse passing near the equator rises considerably high, for example, partially above 90° C. and 90% RH. Under this condition, also the releasing agents with a relatively small aging are deteriorated in the adhesion force to the base material owing to the migration of the plasticizer. In some cases, these agents are liable to transfer to the adhesive layer. In addition, this phenomenon brings about important problems when the releasing agent is applied to a heat resisting protective tape having a relatively large width and being used in a roll form. This protective tape is adhered to a surface or a coated surface of a surfaced-finished stainless or aluminium. A product with the protective tape is then preserved, transported, processed and so on, and it is protected from the outside until the protective tape is finally removed therefrom. Accordingly, the first problem is in that when the roll-shaped tape having a large width is wound off, the winding-off operation is hard ahead of expectations at the time the winding-off force increases even to a little degree due to the aging. As the result, the soft polyvinyl chloride film partially elongate by the force and the winding-off itself is impossible. The second problem is in that when the releasing agent is even partially transferred to the adhesive layer, this transferred agent contaminates the surface of the stainless or aluminium to remarkably deteriorate the goods value. Thus, there is no conventional technique in which one kind of the releasing agents can be widely applied as a releasing coating to a high polar film, a non-polar film and a flexible film having a plasticizer.

However, the inventor has invented another new releasing agent to overcome the above disadvantages. That is, according to the afore-said additional aspect of the present invention, one kind of the releasing agent can be applied as the best releasing coating to the high polar film, the non-polar film and the flexible film having the plasticizer without showing the aging in an atmosphere of a high temperature and humidity. This releasing agent contains a copolymer of the above monomer mixture in the item (a), the monomer having the functional groups in the item (b), and further at least one monomer being selected from the group consisting of cyclohexyl group-containing ethylenically unsaturated compound in an amount of 2 to 30 wt.part per 100 wt.part of the monomer mixture and imidazole compound with ethylenically unsaturated group in an amount of 0.5 to 15 wt.part per 100 wt.part of the monomer mixture. The cyclohexyl group-containing ethylenically compound can be cyclohexyl acrylate and/or cyclohexyl methacrylate. The copolymer comprises further another ethylenically unsaturated compound being copolymerizable with the monomer of the above monomer mixture and being used in such an amount that the amount of the monomer mixture is more than 50 wt.% in the total amount of the copolymer. At least a part of the functional groups is of course cross-linked with the above metal alcoholate having the same general formula:

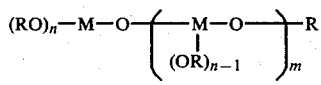

where R, n, m and M are the same as those being aforesaid.

Here, an importance is in that the monomer mixture of stearyl acrylate and/or stearyl methacrylate and acrylonitrile is partially replaced by 2 to 30 wt.part ethylenically unsaturated monomer containing cyclohexyl group

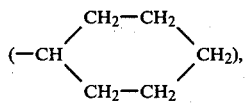

and/or by 0.5 to 15 wt.part imidazole compound with ethylenically unsaturated group. This imidazole compound is represented by

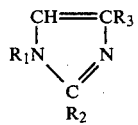

The releasing agent containing the binary copolymer of stearyl acrylate or stearyl methacrylate and acrylonitrile has an effective releasing property when applied to the soft polyvinyl chloride film. This releasing agent, however, tends to show the blocking and transferring at a relatively high temperature above 40° C. and a relatively high humidity. It has been surprisingly found out that the cyclohexyl group-containing monomer and/or the imidazole compound is additionally copolymerized with the above monomer mixture and the above functional groups (particularly active hydrogens)-containing monomer to highly improve the adhesion force between the releasing agent and the base material (particularly the soft polyvinyl chloride) without decreasing the releasing property. Further, this ternary copolymer can admirably prevent the aging such as the blocking, the transferring, the change of the adhesion force in an atmosphere of a high temperature and humidity. If the amounts of the cyclohexyl group-containing monomer and the imidazole compound are less than 2 wt.part and 0.5 wt.part respectively, the aging under the atmosphere of the high temperature and humidity can not be prevented. If the amounts of these monomers are in excess of 30 wt.part and 15 wt.part, the blocking is liable to occur at a higher temperature owing to the decrease of the releasing performance. In the above-described imidazole compound, $R_1$ may be vinyl group or allyl group which contributes to the copolymerization reaction, $R_2$ may be hydrogen (H), alkyl group having carbon numbers of 1 to 18 or phenyl group, and $R_3$ may be hydrogen (H), methyl group or phenyl group. The imidazole compound can be 1-vinyl-2-methylimidazole, 1-vinyl-2-ethylimidazole, 1-vinyl-2,4-dimethylimidazole, 1-vinyl-2-ethyl-4-methylimidazole, 1-allyl-2-methyl-imidazole, 1-allyl-2-phenylimidazole, 1-allyl-2-undecylimidazole and so on.

Another importance of this copolymer is in that the monomer in the amount of 0.5 to 30 wt.part having the functional groups (particularly active hydrogens) reactive with the metal alcoholate is copolymerized with the monomers in the items (a) and (c) and the functional groups are cross-linked with the metal alcoholate so that the density of the cross-linkage and the degree of the polarity in the releasing agent can be optionally controlled. As afore-said, a partial replacement by the high polar monomer can improve the adhesion property between the releasing agent and the base material and can promote the orientation of the long chain alkyl group to obtain an effective releasing property. However, the introduction of the polar group results in a deterioration of the releasing property when the base material is a polyethylene film, polypropylene film, polyvinyl chloride film or the like, whereas it results in a good releasing property when the base material is a relatively high polar paper, cloth, regenerated cellulose film, acetate film, polyester film or the like. The introduction of the polar group is not entirely suitable particularly for the non-polar film containing the plasticizer. Accordingly, it is supposed that there is the best range of the polarity for each base film. The best range of the polarity of the releasing agent can be controlled by that the functional groups, particulariy active hydrogens in the copolymer are cross-linked with the metal alcoholate, according to the present invention. No suitable cross-linking agent can not be found except the metal alcoholate which causes no aging of the releasing coating and which can cross-link the copolymer at a moment to control the density of the cross-linkage and the polarity to the best range. Thus, the present invention enables to produce an effective releasing agent for a considerably wide range of the polarity of the base film by controlling the degrees of the introduction of the polar group and the cross-linking with the metal alcoholate. In addition to this, the releasing agent containing the cyclohexyl group and/or imidazole group according to the present invention can be for the first time effective for the soft polyvinyl chloride film containing the plasticizer. That is, according to the summary of the present invention, the monomer having the functional groups (particularly active hydrogens) is introduced into the copolymer including stearyl acrylate and/or stearyl methacrylate and acrylonitrile and having the cyclohexyl group and/or imidazole group, a part or the total of the functional groups is cross-linked with the metal alcoholate to control the polarity of the releasing agent to an optional range for any base materials and to increase the density of the crosslinkage so as to provide a releasing coating which shows no aging for the high polar film and the plasticizer-containing film even under the condition of high temperature and humidity. It should be noted that these superior effects can be obtained by one kind of the releasing agent according to the present invention.

The monomer mixture in the item (a) can be partially replaced by another ethylenically unsaturated monomer of less than 30 wt.% in the item (d) to improve the flexibility and the cohesion property of the releasing coating. In this case, this unsaturated monomer should be added such that the releasing property is not lowered and the amount of the monomer mixture is not less than 50 wt.%, preferably 70 wt.%. If the addition amount of the unsaturated monomer is in excess of 30 wt.%, the releasing property is lowered and the aging becomes large. The soft polyvinyl chloride film or sheet to be used here containing the plasticizer can be produced in a way that 10 to 60 wt.% plasticizer imparting the flexibility is added to a polyvinyl chloride homopolymer or copolymer containing more than 50 wt.% vinyl chloride monomer, and the resulting flexible polyvinyl chloride is formed into a film or sheet by calender, extrusion, casting or the like. This soft polyvinyl chloride base includes also a film or sheet consisting of a blend of the above vinyl chloride polymer and another polymer. The plasticizer imparting the flexibility can be phthalic acid esters such as dioctyl phthalate (DOP) and dibutyl phthalate (DBP); straight chain dibasic acid esters such as dioctyl adipate (DOA); dioctyl azelate (DOZ), dioctyl sebacate (DOS); phosphoric acid esters such as tricresyl phosphate (TCP), trixylenyl phosphate (TXP); castor oil derivatives such as methylacetyl ricinolate (MAR); epoxized vegetable oils consisting of epoxized unsaturated fatty acids such as soybean oil; ethylene glycol derivatives such as butylphthalylbutylglycolate (BPBG); lower polyester-type plasticizer; chlorides such as paraffin chloride and butylstearate pentachloride; petroleum-type accessory plasticizer obtained by solvent extraction of petroleum-type higher aromatic group components; nitrile-type synthetic rubbers; and so on. The releasing agent can be coated in a solution form and dried on the base mateiral by a coating technique, for example, reverse roll coater, kiss coater, gravure coater, bead coater or knife coater. The drying of the coating can be effected by the method of spontaneous drying, air-circulating oven, steam heating and so on. A ratio of solid materials and a type of a solvent in the solution largely depend on a coating method and a drying apparatus. Useful solvent is aromatic hydrocarbon, ketone, ester or the like. An amount of the releasing coating is in general preferably about 0.01 to 0.20 g/m$^2$ in a dry state, because it is said this amount brings about an effective releasing property. In other words, if it is less than 0.01 g/m$^2$, the blocking is apt to occur, and if it is more than 0.20 g/m$^2$, the adhesive tape is poor in flexibility and becomes hard so that the releasing coating is easy to be peeled off due to the poor bending property.

Next, an example of the pressure sensitive adhesive tape according to the present invention will be described with referrence to the drawings.

Figure 2:
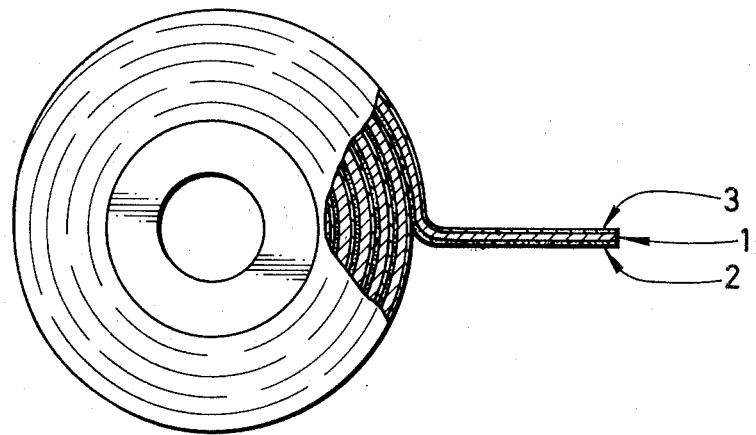
FIG. 2 is a front view of the adhesive tape wound in a roll form, partly shown by an enlarged cross-sectional view.

In FIG. 1, a reference numeral 1 represents a flexible polyvinyl chloride film or sheet containing a plasticizer and a reference numeral 2 represents a pressure sensitive adhesive layer which is adhesive in an ordinary state. A reference numeral 3 represents a releasing agent layer which is formed by coating the releasing agent according to this invention on the base material 1. To improve the adhesion, an undercoating may be formed between the base material 1 and the pressure sensitive adhesive layer 2. FIG. 2 shows the pressure sensitive adhesive tape of FIG. 1 rolled up in spiral.

Hereinafter, the adhesive tape of the present invention will be described in more detail with regard to comparative examples and specific examples.

COMPARATIVE EXAMPLE 1

The releasing agents in this example were made by the following way. First, the stearyl methacrylate of 60 wt.% and the acrylonitrile of 40 wt.% were mixed. Then, 5 wt.% or 10 wt.% of the mixture was replaced by a copolymerizable monomer except cyclohexyl acrylate and cyclohexyl methacrylate so that the amount of the resulting mixture was 100 wt.part. Next, toluene of 100 wt.part and azobisisobutyronitrile (AIBN) of 0.4 wt.part were added thereto. The mixture was reacted at 70° C. in an atomosphere of N$_2$ for four hours. As soon as the temperature thereof reached 85° C., toluene of 33 wt.part and AIBN of 0.4 wt.part were further added to the mixture, and the polymerization reaction was continued for additional four hours. Finally, toluene of 100 wt.part was added to each solution of product to dilute this. The yields of the releasing agent solutions were more than 98% respectively.

The releasing agent solution was diluted with toluene to a concentration of 3% and then coated on a flexible polyvinyl chloride film of 65μ thickness containing 36% plasticizer (dioctyl phthalate) such that the coating weight was about 0.03 g/m$^2$ in a dry state. Then, the solvent was removed by heating at 65° C. for five minutes. On the other side of the base material, a pressure sensitive adhesive agent having the following composition was coated in 40μ thickness in a dry condition, to form a pressure sensitive adhesive tape:

| | |
|---|---|
| Polybutyl acrylate (50% toloul) | 100 wt. part |
| rubber chloride [Adeka Enka Gom (rubber chloride) CR - 20 by Asahi Denka Kogyo K.K.] | 20 wt. part |
| plasticizer (dioctylphthalate) | 5 wt. part |
| tackifier [Sumilight PR - 12603 (terpenephenol resin by Sumitomo Duretsu Co., Ltd.)] | 15 wt. part |

The aging of the tapes was examined. The pressure sensitive adhesive layer of one tape is piled on the releasing agent coating of another tape to get test samples. These samples were left in atmospheres of 20° C. and 15% RH, 40° C. and 90% RH, and 65° C. and 80% RH for three days respectively. As the result, in the hot and wet condition of 65° C. and 80% RH, it was impossible to avoid the influence of the plasticizer and to improve the adhesion property between the polyvinyl chloride and the releasing agent, even if the flexibility of the releasing coating was increased or the polarity was imparted thereto.

The mixture was partially replaced by another copolymerizable monomer. And, samples were tested by the same way as that described above, results of which are shown in the following table 1. Also in these results, the characteristics of the tapes in the condition of a high temperature and humidity were bad. In the following table and subsequent tables, STMA stands for stearyl methacrylate, AN for acrylonitrile, MMA for methyl methacrylate, EMA for ethyl methacrylate, BMA for butyl methacrylate, 2 EHMA for 2-ethylhexyl methacrylate, EA for ethyl acrylate, BA for butyl acrylate, 2EHA for 2-ethylhexylacrylate, AA for acrylic acid, MAA for methacrylic acid, MA for maleic anhydride, GMA for glycidyl methacrylate, VP for vinylpyrolidone, HEMA for 2-hydroxyethyl methacrylate, DM for dimethylaminoethyl methacrylate, N-MAN for N-methylolacrylamide, 3-Cl for 3-chloro-2-hydroxypropyl methacrylate, St for styrene, and VAc for vinyl acetate. In the aging property of the tables, O means a condition of no transferring of the releasing agent to the pressure sensitive adhesive, Δ a condition of a slightly partial transferring of the releasing agent, X a condition of a considerable transferring of the releasing agent, XX a condition of a complete transferring of the releasing agent, and (B) a condition that the adhesive force increases and the blockings were observed due to the difficulty of the releasing.

TABLE 1

| Composition (weight ratio) | | Aging characteristics | | |
|---|---|---|---|---|
| | | 20° C., 65% RH | 40° C., 90% RH | 65° C., 80% RH |
| STMA/AN/— | = 60/40/— | O ~ Δ | O ~ Δ | X (B) |
| STMA/AN/MMA | = 54/36/10 | O | O | X (B) |
| STMA/AN/EMA | = 54/36/10 | O | O | X (B) |
| STMA/AN/BMA | = 54/36/10 | O Δ | O | X (B) |
| STMA/AN/2EHMA | = 54/36/10 | O | O | X (B) |
| STMA/AN/EA | = 54/36/10 | O | O | X (B) |
| STMA/AN/BA | = 54/36/10 | O | O | X (B) |
| STMA/AN/2EHA | = 54/36/10 | O | O | X (B) |
| STMA/AN/AA | = 57/38/5 | O | X | X X |
| STMA/AN/AA | = 54/36/10 | O | X | X X |
| STMA/AN/MAA | = 57/38/5 | O | O | X |
| STMA/AN/MAA | = 54/36/10 | Δ | Δ | O Δ |
| STMA/AN/MA | = 57/38/5 | O | O | X (B) |
| STMA/AN/MA | = 54/36/10 | O | O | X (B) |
| STMA/AN/GMA | = 54/36/10 | O | O | X (B) |
| STMA/AN/VP | = 54/36/10 | O | Δ | Δ |
| STMA/AN/HEMA | = 54/36/10 | O Δ | O Δ | Δ |
| STMA/AN/DM | = 54/36/10 | O | O | X (B) |
| STMA/AN/N-MAN | = 54/36/10 | O | O | X (B) |
| STMA/AN/3-Cl | = 54/36/10 | O | O | X (B) |
| STMA/AN/St | = 54/36/10 | O | O | X (B) |
| STMA/AN/VAc | = 54/36/10 | O | O | X (B) |

COMPARATIVE EXAMPLE 2

Stearyl methacrylate of 60 g, acrylonitrile of 40 g, toluene of 100 g and azobisisobutyronitrile (AIBN) were mixed in a flask of 1 l with three necks and a round bottom. The flask had a stirrer, a reflux condenser and a heating mantle. Then, after the air in the flask was exchanged for $N_2$ gas, the mixture was heated with stirring at 70° C. for four hours. Next, a solution containing toluene of 33 g and AIBM of 0.4 g was dropped into the flask with a dropping funnel and simultaneously the temperature of the mixture was raised to 85° C. and the polymerization was then continued for four hours. After the reaction, toluene of 100 g was added thereto to produce a releasing agent solution having a theoretical solid component of 30%. An amount of its real solid component was 29.9%. Similarly to the comparative example 1, three samples were made from a soft polyvinyl chloride film of 65μ thickness containing a plasticizer of 36%, a regenerated cellulose film of about 50μ thickness, and a polyester film of 25μ thickness. These films were kept in atmospheres of 20° C. and 65% RH, 40° C. and 90% RH, and 65° C. and 80% RH for three days. Thereafter, as to each sample two tapes of 5 cm width was forcibly separated from each other at the speed of 300 mm/min such that the releasing coating of one tape was released from the pressure sensitive adhesive layer of another tape. The results are shown in the following table 2, which shows the aging of the releasing property appears about all samples.

COMPARATIVE EXAMPLE 3

Adipic acid of 5 mol, trimethylolpropane of 1 mol and ethylene glycol of 5 mol were mixed. The mixture was heated initially at 90° C. with stirring and the temperature was gradually raised to 180° C. after 10 hours. The mixture was so polymerized that an acid value became 1(one). During the reaction, nitrogen gas was slowly introduced into the solution and water produced as the reaction proceeded was discharged out of the reactor. For the last three hours in the reaction, the reactor was put under a reduced pressure and dehydrated completely. When the total reaction time was 25 hours, produced polyester was jellied and had an average molecular weight of about 960 and the number of hydroxyl group was three on an average per molecule. Next, this polyester of 100 part and octadecylisocyanate of 92 part were added to xylene of 400 part. In a reactor having a reflux condenser, the mixture was reacted with stirring at the boiling point. The mixture was initially separated into two phases because of the insolubility of polyester to xylene, however, the solution become transparent completely after four hours because polyester dissolved into xylene during the reaction. The solution was then stirred for two hours to complete the reaction. When the reacted solution was calmly cooled to 5° C., a wax-like product was deposited. This product was separated by decantation from xylene and washed two times by cooled xylene of 50 cc. Thus obtained reaction product (releasing agent) was dissolved into toluene to form a 3% toluene solution.

TABLE 2

| Base Material | Examination | | | | | | |
|---|---|---|---|---|---|---|---|
| | Releasing Property (T-shaped releasing, g/5cm) | | | | Aging Property | | |
| | Initial State | 20° C., 65% RH after 3 days | 40° C., 90% RH after 3 days | 65° C., 80% RH after 3 days | 20° C., 65% RH after 3 days | 40° C., 90% RH after 3 days | 65° C., 80% RH after 3 days |
| regenerated cellulose | 120 | 140 | 280 | 625 | O | O | Δ |
| polyester | 115 | 145 | 335 | 510 | O | O | O |
| soft polyvinyl chloride | 600 | 590 | 360 | above 1200 | O ~ Δ | O ~ Δ | X (B) |

This solution was coated on a flexible polyvinyl chloride film, regenerated cellulose film and polyester film similarly to the comparative example 1 to obtain each sample. After the sample was kept in atmospheres of 20° C. and 65% RH, 40° C. and 90% RH, and 65° C. and 80% RH for three days, the aging such as the change of the releasing property, the blocking between the pressure sensitive adhesive agent layer and the releasing agent layer, and the transfer of the releasing agent was observed. The results are shown in the following table 3. According to these results, the change of the releasing property appears independently to the temperature and the humidity, and particularly, the aging property regarding the flexible polyvinyl chloride is remarkably deteriorated.

EXAMPLE 1

Stearyl methacrylate of 60 wt.% and acrylonitrile of 40 wt.% were mixed and then 2 wt.% of the mixture was replaced by methacrylic acid. Toluene of 100 wt.part and AIBN of 0.4 wt.part were added to the mixture. The mixture was then polymerized under the similar condition to the comparative example 1. The yield of the polymerized solution was 98.5%. Next, the solution was diluted with isopropyl alcohol in an amount corresponding to 15% of the solvent to form a diluted solution having a concentration of 3%. This solution was added by tetrabutyl titanate (titanium tetrabutylate) in amount which corresponds to half equivalent or an equivalent of the theoretical amount of the active hydrogens in carboxylic acid contained in the releasing agent. This solution containing the releasing agent was then coated on each one side of a regenerated cellulose film of about 50μ thickness, polyester film of 25μ thickness and flexible polyvinyl chloride film of 65μ thickness containing about 36% plasticizer.

such that the coating was about 40μ in thickness in a dry state. Each aging of these samples was examined similarly to the comparative example 1. According to the results shown in the following table 4, it will be understood that the effect by the cross-linking with the metal alcoholate against the aging is obtained particularly at a high temperature and humidity.

EXAMPLE 2

Stearyl methacrylate of 49.8 part, acrylonitrile of 33.2 part, cyclohexyl methacrylate of 10 part, methacrylic acid of 2 part, butylacrylate of 5 part, toluene of 100 part and the AIBN of 0.4 part were mixed. The mixture was polymerized under the similar condition to the comparative example 1. As the result, the yield of the releasing agent was 98.8%. Similarly to the example 1, hexamethyl dititanate was added thereto, and this solution was coated on a regenerated cellulose film, polyester film and flexible polyvinyl chloride film. Each aging property of these samples was examined. According to the results shown in the following table 5, it is apparent that there is the best cross-linking condition for each film in accordance with the degree of the cross-linking

TABLE 3

| Base Material | Examination | | | | | | |
|---|---|---|---|---|---|---|---|
| | Releasing Property (T-shaped releasing, g/5cm) | | | | Aging Property | | |
| | Initial Stage | 20° C., 65% RH after 3 days | 40° C., 90% RH after 3 days | 65° C., 80% RH after 3 days | 20° C., 65% RH after 3 days | 40° C., 90% RH after 3 days | 65° C., 80% RH after 3 days |
| regenerated cellulose | 113 | 120 | 353 | 820 | O | O | O Δ |
| Polyester | 98 | 118 | 389 | 753 | O | O | O Δ |
| soft polyvinyl chloride | 520 | 830 | 1280 | above 1400 | O Δ | O Δ | X(B) |

In this case, the coating weight was about 0.03 g/m² in a dry state. On each other side of these films, the above-described pressure sensitive adhesive agent was coated with the metal alcoholate, and that it is enough for any films to use only one kind of releasing agent.

TABLE 4

| Base Material | Addition Amount of Metal Alcoholate (equivalent to active hydrogen) | Examination | | | | | | |
|---|---|---|---|---|---|---|---|---|
| | | Releasing property (T-shaped releasing,g/5cm) | | | | Aging Property | | |
| | | Initial state | 20° C. 65% RH after 3 days | 40° C. 90% RH after 3 days | 65° C. 80% RH after 3 days | 20° C. 65% RH after 3 days | 40° C. 90% RH after 3 days | 65° C. 80% RH after 3 days |
| regenerated cellulose | 0 | 65 | 113 | 406 | 823 | O | O | Δ |
| | ½ | 110 | 115 | 125 | 235 | O | O | O |
| | 1 | 115 | 113 | 150 | 283 | O | O | Δ |
| polyester | 0 | 60 | 105 | 413 | 670 | O | O | O |
| | ½ | 120 | 120 | 122 | 213 | O | O | O |
| | 1 | 128 | 125 | 130 | 250 | O | O | Δ |
| soft polyvinyl chloride | 0 | 600 | 575 | 400 | above 1200 | O Δ | Δ | X(B) |
| | ½ | 610 | 580 | 480 | 800 | O | O | Δ |
| | 1 | 623 | 580 | 330 | 300 | O | O | O Δ |

TABLE 5

| Base Material | Addition amount of Metal Alcoholate (equivalent to active hydrogen) | Examination | | | | | | |
|---|---|---|---|---|---|---|---|---|
| | | Releasing Property (T-shaped releasing, g/5cm) | | | | Aging Property | | |
| | | Initial State | 20° C. 65% RH after 3 days | 40° C. 90% RH after 3 days | 65° C. 80% RH after 3 days | 20° C. 65% RH after 3 days | 20° C. 90% RH after 3 days | 65° C. 80% RH after 3 days |
| regenerated cellulose | 0 | 73 | 120 | 385 | 732 | O | O | Δ |
| | ½ | 113 | 118 | 120 | 255 | O | O | O |
| | 1 | 110 | 118 | 138 | 293 | O | O | Δ |
| polyester | 0 | 65 | 103 | 398 | 680 | O | O | Δ |
| | ½ | 117 | 125 | 132 | 224 | O | O | O |
| | 1 | 120 | 120 | 125 | 203 | O | O | Δ |
| soft polyvinyl | 0 | 400 | 410 | 520 | 980 | O Δ | O Δ | ΔX |
| | ½ | 400 | 432 | 485 | 730 | O | O | O |

TABLE 5-continued

| Base Material | Addition amount of Metal Alcoholate (equivalent to active hydrogen) | Examination | | | | | | |
|---|---|---|---|---|---|---|---|---|
| | | Releasing Property (T-shaped releasing, g/5cm) | | | | Aging Property | | |
| | | Initial State | 20° C. 65% RH after 3 days | 40° C. 90% RH after 3 days | 65° C. 80% RH after 3 days | 20° C. 65% RH after 3 days | 20° C. 90% RH after 3 days | 65° C. 80% RH after 3 days |
| chloride | 1 | 383 | 370 | 388 | 400 | O | O | O |

EXAMPLE 3

Stearyl methacrylate of 55.8 part, acrylonitrile of 37.2 part, 1-vinyl-2-methylimidazole of 5 part, methacrylic acid of 2 part, toluene of 100 part and AIBN of 0.4 part were mixed. This mixture was polymerized under the similar condition to the comparative example 1. As the result, the yield of the polymer was 98.2% similarly to the example 1, triethanolamine titanium diisopropylate was added to the solution and samples were made by the use of the solution containing the releasing agent. Results of the aging test are shown in the following table 6. These results are similar to those of the example 2. It will be apparent that when the releasing agent containing imidazole groups is cross-linked with the metal alcoholate, and effective releasing property showing no aging and being suitable for the base material widely selected can be obtained by one kind of releasing agent.

EXAMPLE 4

Stearyl methacrylate of 41.5 part, acrylonitrile of 41.5 part, cyclohexyl methacrylate of 10 part, methacrylic acid of 2 part, butylacrylate of 5 part, toluene of 100 part and AIBN of 0.4 part were mixed. The mixture was polymerized and samples were made similarly to the above-described manner. In this case, ethylacetoacetate alminium diisopropylate was used as the metal alcoholate, and the releasing agent was coated on a flexible polyvinyl chloride film containing plasticizer of 36%. After these samples were kept in the hot atmospheres of 80° C., 100° C. and 130° C. for three days, they were observed with respect to the aging characteristics, the results of which are shown in the following table 7. In these results, neither blocking nor transfer is observed even at 130° C. and so the very superior releasing characteristic can be obtained.

TABLE 7

| Base Material | Addition Amount of Metal Alcoholate (equivalent to active hydrogen) | Examination | | | | |
|---|---|---|---|---|---|---|
| | | Aging characteristics on Temperature (T-shaped releasing, g/5cm) | | | | |
| | | 20° C. after 3 days | 50° C. after 3 days | 80° C. after 3 days | 100° C. after 3 days | 130° C. after 3 days |
| soft polyvinyl chloride | 0 | 600 | 700 | 1000 | above 1200 | above 1200 |
| | ½ | 450 | 520 | 730 | 985 | above 1200 |
| | 1 | 400 | 400 | 400 | 480 | 600 |

EXAMPLE 5

Stearyl methacrylate of 52.8 part, acrylonitrile of 35.2 part, cyclohexyl methacryllate of 8 part, 1-vinyl-2-methylimidazole of 2 part, methacrylic acid of 2 part, toluene of 100 part, and AIBN of 0.4 part were polymerized under the similar condition to the comparative example. The yield of the polymer was 98.8%. Similarly to the example 1, after titanium tetraisopropylate was added to the solution, samples were made by use of this releasing agent to be examined. Results of the examinations are shown in the following table 8. In these results, it was confirmed that the superior releasing characteristics wherein the aging is little can be obtained in the flexible polyvinyl chloride films.

EXAMPLE 6

Stearyl methacrylate of 60 wt.% and acrylonitrile of 40 wt.% were mixed. Then 10 wt.% of the mixture was changed with cyclohexyl methacrylate. On the other hand, a couple of monomers including reactive functional groups shown in the following table 9 were polymerized. These were mixed with each other and coated on flexible polyvinyl chloride films similarly to the comparative example 1.

TABLE 6

| Base Material | Addition Amount of Metal Alcoholate (equivalent to active hydrogen) | Examination | | | | | | |
|---|---|---|---|---|---|---|---|---|
| | | Releasing Property (T-shaped releasing,g/5cm) | | | | Aging Property | | |
| | | Initial State | 20° C. 65% RH after 3 days | 40° C. 90% RH after 3 days | 65° C. 80% RH after 3 days | 20° C. 65% RH after 3 days | 40° C. 90% RH after 3 days | 65° C. 80% RH after 3 days |
| regenerated cellulose | 0 | 85 | 117 | 400 | 683 | O | O | Δ |
| | ½ | 115 | 116 | 130 | 243 | O | O | O |
| | 1 | 113 | 120 | 138 | 175 | O | O | Δ |
| polyester | 0 | 75 | 115 | 388 | 750 | O | O | Δ |
| | ½ | 120 | 117 | 151 | 250 | O | O | O |
| | 1 | 125 | 130 | 158 | 273 | O | O | Δ |
| soft polyvinyl chloride | 0 | 600 | 660 | 520 | 520 | O Δ | Δ | Δ |
| | ½ | 530 | 500 | 435 | 480 | O | O | O |
| | 1 | 425 | 433 | 420 | 400 | O | O | O |

TABLE 8

| Base Material | Addition Amount of Metal Alcoholate (equivalent to active hydrogen) | Examination Aging characteristics on Temperature (T-shaped releasing, g/5cm) | | | | |
|---|---|---|---|---|---|---|
| | | 20° C. after 3 days | 50° C. after 3 days | 80° C. after 3 days | 100° C. after 3days | 130° C. after 3 days |
| soft polyvinyl chloride | 0 | 500 | 800 | above 1200 | above 1200 | above 1200 |
| | ½ | 400 | 400 | 500 | 800 | above 1200 |
| | 1 | 300 | 320 | 340 | 460 | 480 |

After these samples were bridged under the respective conditions shown in the table 9, they were kept in the atmosphere of 65° C. and 80% RH for three days, results of which are shown in the table 9. In these results, the aging appears on all samples except the sample using metal alcoholate.

In the table 9, the ratio (A/B) of the bridging functional groups were determined so as to react 100% theoretically. The monomers apt to react with each other in polymerizing were prepared separately and then mixed at the last of the compounding operation.

While the invention has been particularly shown and described with reference to the specific examples thereof, it will be understood by those skilled in the art that various changes in form and details may be made therein without departing from the spirit and scope of the invention.

TABLE 9

| Bridging functional group | | Amount of functional group in copolymer (wt. %) | Condition for bridging | 65° C., 80% RH, after 3 days Blocking |
|---|---|---|---|---|
| A | B | | | |
| —COOH | —CH——CH$_2$ \\ \/ \\ O | 3 | 100° C., 30 min. | X |
| —COOH | —CH$_2$OH | 5 | " | X |
| —CH$_2$OH | —NCO | 5 | 20° C., 1 day | Δ |
| —COOH | —NH$_2$ | 5 | 120° C., 30 min. | X |
| —COOH | metal alcoholate | 3 | 65° C., 5 min. | O |

What is claimed is:

1. A composition suitable for treating a base member to impart a releasing property thereto consisting of:
   (A) a copolymer which is produced by copolymerization of:
   (a) a monomer mixture comprising 70 to 40 percent by weight stearyl acrylate and/or stearyl methacrylate and 30 to 60 percent by weight acrylonitrile; and
   (b) an ethylenically unsaturated compound being copolymerizable with said monomer mixture and having functional groups reactive with metal alcoholate, said ethylenically unsaturated compound being used in an amount of 0.5 to 30 part by weight per 100 part by weight of said monomer mixture; and
   (B) a metal alcoholate being represented by the following general formula:

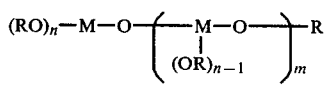

wherein R is a hydrocarbon group having 1 to 20 carbon atoms or this hydrocarbon group further having oxygen atom, nitrogen atom, sulfur atom or halogen atom, including the case R being identical or not identical with each other in the general formula and R being combined with each other, n is an integer from 1 to 4, m is an integer from zero to 10, and M is a metal element belonging to III, IV and V groups of the periodic table.

2. A composition according to claim 1, wherein said functional groups are carboxyl groups, hydroxyl groups, amino groups, amido groups or epoxy groups.

3. A composition according to claim 1, wherein said metal alcoholate is added in an amount of 0.01 to 30 part by weight per 100 part by weight of said copolymer.

4. A composition according to claim 1, wherein said copolymer further comprises at least one monomer being selected from the group consisting of cyclohexyl group-containing ethylenically unsaturated compound in an amount of 2 to 30 part by weight per 100 part by weight of said monomer mixture, and imidazole compound with ethylenically unsaturated group in an amount of 0.5 to 15 part by weight per 100 part by weight of said monomer mixture.

5. A composition according to claim 4, wherein said imidazole compound is represented by the general formula:

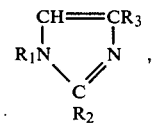

where R$_1$ is vinyl group or allyl group, R$_2$ is hydrogen (H), alkyl group having carbon numbers of 1 to 18 or phenyl group, and R$_3$ is hydrogen (H), methyl group or phenyl group.

6. A composition according to claim 1, wherein said metal alcoholate is alcoholate of aluminium or titanium.

7. A composition according to claim 1, wherein said copolymer further comprises another ethylenically unsaturated compound being copolymerizable with the monomer of said monomer mixture and being used in an amount of 0 to 30 part by weight per 100 part by weight of said monomer mixture.

8. A composition according to claim 4, wherein said copolymer further comprises another ethylenically unsaturated compound being copolymerizable with the monomer of said monomer mixture and being used in such an amount that the amount of said monomer mixture is more than 50 percent by weight in the total amount of said copolymer.

9. A composition according to claim 4, wherein the releasing agent is applied to a non-polar film or sheet containing a plasticizer.

10. A composition according to claim 1, wherein the releasing agent is used in a way that it is coated on a base material in an amount of about 0.01 to 0.20 g/m² in a dry state.

11. A composition according to claim 9, wherein said film is a polyvinyl chloride film containing 10 to 60 percent by weight plasticizer.

12. A composition according to claim 1, wherein said monomer mixture comprises 60 to 50 percent by weight steary acrylate and/or stearyl methacrylate and 40 to 50 percent by weight acrylonitrile.

13. A composition according to claim 3, wherein the addition amount of said metal alcoholate is 0.05 to 10 part by weight per 100 part by weight of said copolymer.

14. A composition according to claim 8, wherein said another ethylenically unsaturated compound is used in such an amount that the amount of said monomer mixture is more than 70 percent by weight in the total amount of said copolymer.

* * * * *